Sept. 16, 1969  J. N. BINNS  3,466,721
TOOL HOLDER
Filed Aug. 17, 1966
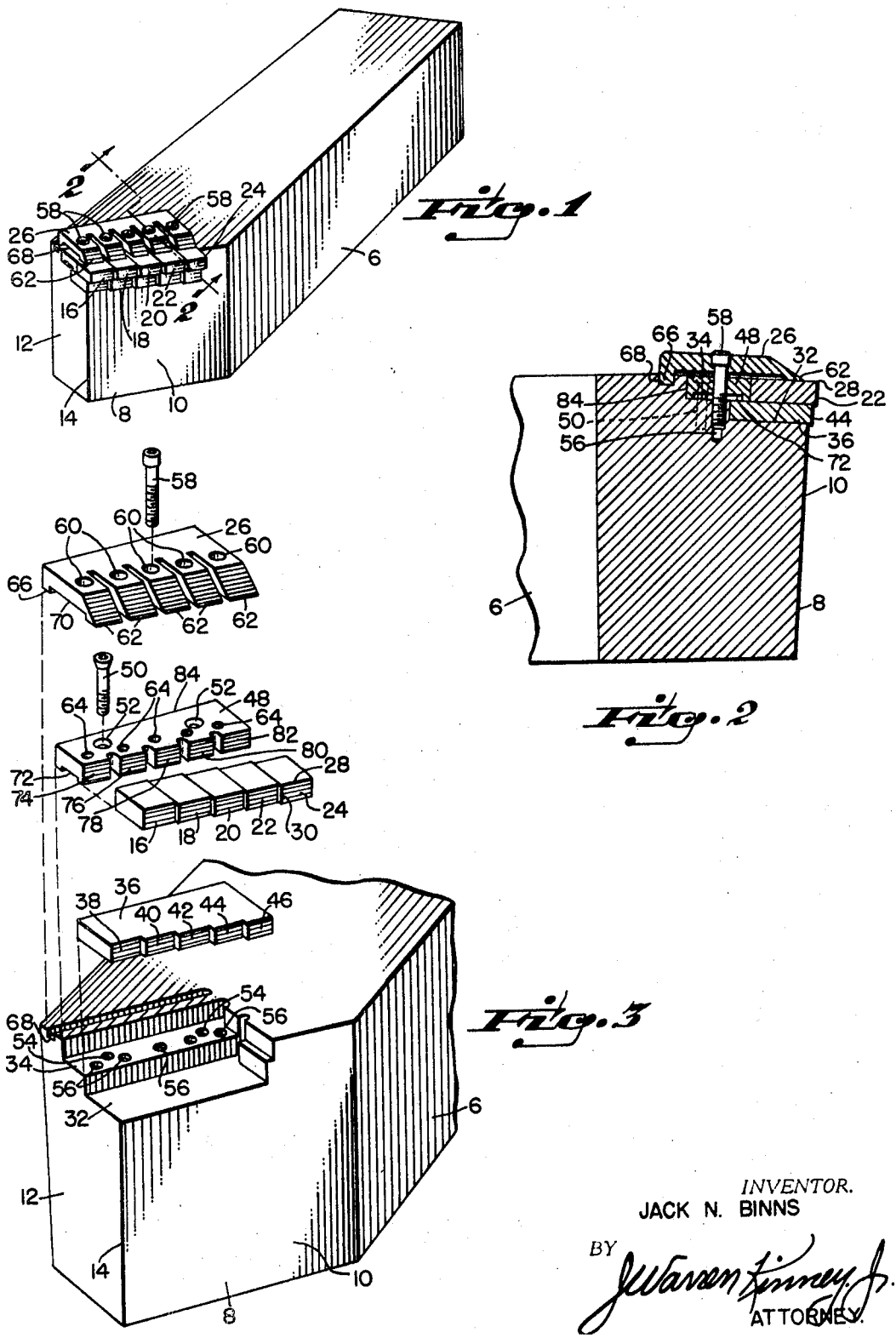
INVENTOR.
JACK N. BINNS
BY J. Warren Kinney Jr.
ATTORNEY.

3,466,721
TOOL HOLDER
Jack N. Binns, 4886 Oaklawn Ave.,
Cincinnati, Ohio 45227
Filed Aug. 17, 1966, Ser. No. 572,971
Int. Cl. B26d 1/00
U.S. Cl. 29—97                                16 Claims

ABSTRACT OF THE DISCLOSURE

The lathe tool has a nose portion supporting a multiplicity of individual small cutters arranged in side-by-side relation, with their cutting edges progressively extended, to make possible the removal of metal from a workpiece at an exceptionally high rate during a single pass of the tool. The individual small cutters are inexpensive, easily reconditioned and replaced when necessary, and have a prolonged service life due to a reduction of thermal stress occurring in the cutting zone as the result of the cutter disposition and arrangement.

---

This invention relates to a cutting tool, such as may be used in a lathe or other machine for the shaping of metallic workpieces.

An object of the invention is to provide an improved cutting tool having the ability to displace metal from a workpiece at an unusually high removal rate, and to perform this function with great economy and accuracy.

Another object of the invention is to provide a cutting tool of the character stated, which may be reconditioned when necessary, with a minimum expenditure of time, labor, skill and expense.

A further object of the invention is to provide an improved and highly serviceable multiple-cutter tool for the rapid removal of metal, and in which thermal stress in the cutting zone is materially reduced, thereby to prolong the cutting life of the tool and reduce the risk of damage to the workpiece and the tool itself.

The foregoing and other objects are attained by the means described herein and illustrated upon the accompanying drawing, in which:

FIG. 1 is a perspective view of the improved cutting tool, assembled in readiness for use.

FIG. 2 is a fragmentary enlarged cross-section taken on line 2—2 of FIG. 1.

FIG. 3 is an enlarged exploded perspective view of the tool shown in FIGS. 1 and 2.

The cutting tool of the invention may comprise a shank 6, having a nose end 8 which may be shaped in any suitable manner for proper presentation of a cutter to the workpiece. In the example illustrated, the nose end of the tool is provided with an angled face 10 and an angled side 12, meeting along a forward corner edge 14. The forward face 10 may be relieved inwardly and downwardly as suggested by FIG. 2. Face 10 may be disposed at any predetermined angularity to the axis of shank 8, depending upon the nature of the cut to be performed upon a given workpiece, as will be understood.

At the nose of the tool shank, there is provided means for the support of a gang or series of individual cutters or inserts denoted by reference characters 16, 18, 20, 22 and 24. The cutters or inserts each may be provided with cutting edges defining some or all of the six faces thereof, as desired. When a cutter is in the use position, as shown at 22, FIG. 2, its active cutting edge or edges will be projected slightly beyond nose face 10. The mean plane of each cutter may be disposed approximately at right angles to the relieved face 10 of the tool nose. By preference, though not of necessity, all of the cutters or inserts may be of uniform thickness, so that they may be held conveniently in the cutting position by means of a single overlying clamp plate 26 secured to the tool shank.

Clamp plate 26 may be of one-piece construction, and is adapted to clamp the individual cutters in side-by-side relationship, with the active cutting edges of successive cutters projected in step fashion, at the forward face 10 of the tool shank. The "active cutting edges" are those identified at 28 and 30 of cutter 24, FIG. 3, and the corresponding edges of cutters 16, 18, 20 and 22.

From face 10 inwardly, the shank of the tool may be machined to form thereon a forward shelf or seat 32, and an adjacent rearward shelf or seat 34 elevated relative to seat 32. The shelves or seats mentioned rest in separate planes that are substantially parallel to one another, and disposed at approximate right angles to the plane of face 10.

Seat or shelf 32 is adapted to support an anvil or cutter support plate 36, which bears flatwise thereon, and forms a rigid rest for the cutters or inserts 16, 18, 20, 22 and 24. The forward edge of the anvil desirably is stepped to provide projections 38, 40, 42, 44 and 46. The projections each support an overlying cutter, with the cutter slightly overhanging as in FIG. 2.

A back-up plate 48 for the several cutters rests upon shelf or seat 34, and spans said seat to overlap and impinge upon the upper face of anvil 36 (FIG. 2), said back-up plate being secured to shank 8 by means of screws 50 passing through holes 52 in the plate, and having screw-threaded engagement in tapped holes 54 provided in the shank. A line of tapped holes 56 in the shank receives the threaded ends of clamp screws 58, which pass through holes 60 in clamp fingers 62, and through the registering holes 64 of back-up plate or cutter stop member 48. By means of this arrangement, the several fingers 62 of the clamp plate will individually clamp the several cutters firmly upon anvil or cutter support plate 36, for holding the cutters in operating position. The cutter stop or back-up plate, by contacting the rear ends of the cutters, precludes shifting of the cutters away from a workpiece undergoing shaping by the cutters.

To maintain clamp plate 26 in proper position upon the several cutters, said plate may be provided with a downwardly projected rib 66 adapted to engage a channel 68 formed in the upper face of the tool shank rearwardly of shelf or seat 34. The channel may be parallel to the shelf 34, as shown. Between rib 66 and the forward end portions of fingers 62, the underside of the clamp plate may be channeled or relieved as at 70, to ensure a firm bearing of the fingers upon the several cutters or inserts 16, 18, 20, 22 and 24.

To ensure a firm bearing of plate 48 upon anvil 36, said plate may be longitudinally channeled as at 72. Plate 48, as shown in FIG. 3, may be provided with individual separated stop faces or abutments 74, 76, 78, 80 and 82, to individually back up the rear ends of the several cutters or inserts. If the cutters or inserts are all of the same length, the stop faces or abutments 74 to 82 may be stepped progressively more distant from the rear edge 84 of the back-up plate, or shims may be inserted between said stop faces and the rear ends of the cutters, to ensure progressive cutting of the workpiece, by the gang of cutters. Each cutter may assume a share of the cutting load, and should one cutter fail or break under the load, it may quickly and economically be replaced by a new cutter, or one which has been reconditioned.

The stepped arrangement of the abutments 74, 76, 78, 80 and 82, of back-up plate 48, should preferably correspond with the steps provided on cutter support plate 36, so that all of the cutters may receive equal support in resisting load imposed thereon by a workpiece undergoing shaping. Also, it is desirable that the fingers of clamp plate 26 be similarly stepped as to their reach, in substantial correspondency with the step arrangement of parts 36 and 48, thereby to provide a maximum hold-down force for each cutter. It should be understood that all of the cutters, or inserts, preferably are of the same size in order to achieve the greatest economy of manufacture thereof, so that they may be advantageously discarded or thrown away upon becoming damaged or excessively worn.

The use of a series of small cutters permits unusually deep or wide cuts to be made, often without the aid of a coolant. The small individual cutters are relatively inexpensive, and may be considered throw-away inserts. Higher metal removal rates are possible with the use of the small individual cutters, than with a single cutter of comparable width, because the single larger cutter is more vulnerable to breakage due to thermal stresses along the longer cutting edge. Also, in the event of breakage or damage, the resulting loss involves merely a few inexpensive inserts, rather than a whole cutter of costly design.

In the event of wear or chipping, one or more of the inexpensive inserts or cutters may be replaced and indexed to the work, rather than replacing or regrinding an expensive large cutter bit. Each insert may be furnished with a number of cutting edges to be used alternatively. The individual small cutters may be formed of the usual materials employed in the metal cutting art, at greatly reduced expense.

Various modifications and changes may be made in the cutting tool of the present invention, within the scope of the appended claims, without departing from the spirit of the invention. For example, the nose of the cutter shank is subject to variations in shape dictated by the nature of the work to be performed, or the character of the workpiece to be treated. The cutters or inserts, moreover, may be supported at various angles to the axis of the shank or to the axis of the workpiece. In some instances, the step distances between the cutters may be varied, or if desired, an endmost cutter of the group may be adjusted for removal of a limited amount of metal, thereby to produce a finishing cut upon the workpiece. The cutting edges of the cutters or inserts are not necessarily straight, nor are they necessarily at right angles to the major axes of the pieces constituting the cutters or inserts. Those mentioned above are but a few of the modifications which may be resorted to in constructing the improved cutting tool of the present invention.

What is claimed is:

1. A cutting tool for rapid removal of metal from a workpiece, comprising in combination: an elongate shank having a nose including a forward face disposed transversely of the major axis of the shank; a multiplicity of individual cutters each having a forward and a rear end, opposite parallel flat sides, and upper and lower flat faces disposed in planes parallel to one another, said cutters each being of rectangular cross-section and each having at least one cutting edge along a forward end thereof to engage a workpiece; and means supporting and clamping the individual cutters in substantial side by side relationship upon the nose of the shank, with the flat sides of adjacent cutters in bearing contact one against another, and the upper flat faces thereof disposed in a common plane which includes the aforesaid cutting edges, said cutting edges being extended beyond the forward face of said nose.

2. The tool as specified by claim 1, wherein the cutting edges of successive cutters are arranged in step formation at said forward face, to remove metal progressively from a workpiece movable relative to said cutters.

3. The tool as specified by claim 1, wherein the cutting edges of successive cutters are arranged at progressively greater distances beyond the forward face of the tool nose.

4. The tool as specified by claim 1, wherein all of the cutters are of substantially equal dimensions, and limited as to size, for throw-away discarding upon becoming damaged or excessively worn.

5. The tool as specified by claim 2 wherein all of the cutters are of limited size, for economical throw-away discarding upon becoming ineffective to perform their intended service.

6. The tool as specified by claim 5, wherein is included a single clamp plate holding the cutters in cutting position relative to a workpiece, said clamp plate comprising a plurality of individual fingers equal in number to the number of cutters, said fingers each overlying an upper flat face of an individual cutter.

7. The tool as specified by claim 1, wherein is included a single clamp plate holding the cutters in cutting position relative to a workpiece, said clamp plate comprising a plurality of individual fingers equal in number to the number of cutters, said fingers each overlying an upper flat face of an individual cutter.

8. The tool as specified by claim 7, wherein is included a single back-up plate abutting the cutters at their ends opposite the cutting edges, to preclude displacement of the cutters away from the workpiece.

9. A cutting tool for shaping a workpiece, comprising in combination: a shank having a nose including a forward face; a multiplicity of individual small cutters each having a forward and a rear end, opposite sides, and upper and lower faces, said cutters each having at least one cutting edge at the forward end thereof; a forward shelf formed at the nose of the shank and having a planar seat portion disposed substantially perpendicularly to the forward face of the shank nose; a cutter support plate disposed flatwise upon said seat portion, said plate having an upper face, and a forward edge; a series of forward projections on the forward edge of the support plate, said projections extending progressively greater distances from one end of the support plate to the other, the projections being equal in number to the number of cutters, for supporting the cutters in side by side abutment, with the cutting edges thereof overhanging the projections and the forward face of the shank nose; and means including a clamp for detachably securing the cutters upon the shank, with the cutting edges of the cutters extended forwardly of the cutter support plate projections.

10. The tool as specified by claim 9, wherein is included means to back-stop the cutters against shifting movement rearwardly of the forward face of the shank nose.

11. The tool as specified by claim 9, wherein a second shelf is formed upon the shank adjacent to the first-mentioned shelf, and at a higher elevation substantially equal to the thickness of the cutter support plate; a back-up plate overlying the second shelf and a portion of the cutter support plate, said back-up plate having forward abutment faces to abut the rear ends of cutters resting upon the cutter support plate; a clamp plate substantially covering the back-up plate, and having a forward portion to press the several cutters onto the forward projections of the cutter support plate; and means detachably securing the clamp plate to the shank, with the forward portion of the clamp plate pressing the cutters onto the projections of the cutter support plate.

12. A cutting tool for shaping a workpiece, comprising in combination: a shank having a nose including a forward face; a multiplicity of individual small cutters each having a forward and a rear end, opposite sides, and upper and lower faces, said cutters each having at least one cutting edge at the forward end thereof; a forward shelf formed at the nose of the shank and having a planar seat portion disposed substantially perpendicularly to the forward face of the shank nose; a cutter support plate disposed flatwise upon said seat portion, said plate having an upper face, and a forward edge; a series of forward projections on the forward edge of the support plate, said projections extending progressively greater distances from one end of the support plate to the other, the projections being equal in number to the number of cutters, for supporting the cutters with the cutting edges thereof overhanging the projections and the forward face of the shank nose; a second shelf formed upon the shank adjacent to the first-mentioned shelf, and at a higher elevation substantially equal to the thickness of the cutter support plate; a back-up plate overlying the second shelf and a portion of the cutter support plate, said back-up plate having forward abutment faces to abut the rear ends of cutters resting upon the cutter support plate; a clamp plate substantially covering the back-up plate, and having a forward portion constituted of individual fingers each overlying a forward projection of the cutter support plate and the individual cutters superposed thereon; and means detachably securing the clamp plate to the shank, with the fingers of the clamp plate pressing the cutters onto the projections of the cutter support plate, and with the cutting edges of the cutters extended forwardly of the cutter support plate projections.

13. The tool as specified by claim 12, wherein the fingers reach over the cutters in substantial correspondency with the reach of the forward projections of the cutter support plate.

14. The tool as specified by claim 13, wherein the means for securing the clamp plate upon the shank comprises a plurality of screws, each of which screws passes through an opening in a finger, and has anchorage in the material of the shank.

15. The tool as specified by claim 12, wherein said back-up plate having a plurality of abutment faces each abutting a rear end of a cutter, said abutment faces being in progressively stepped formation in substantial correspondency with extension of the forward projections of the cutter support plate.

16. The tool as specified by claim 15, wherein the means for securing the clamp plate upon the shank comprises a plurality of screws, each of which screws passes through an opening in a finger, and has anchorage in the material of the shank.

References Cited

UNITED STATES PATENTS

| 2,893,110 | 7/1959 | Gibson | 29—97 |
| 3,018,675 | 1/1962 | Klages | 77—58 |
| 3,027,623 | 4/1962 | Severson | 29—96 |
| 3,028,657 | 4/1962 | Almer | 29—96 |
| 3,180,006 | 4/1965 | Emmons | 29—97 |

FOREIGN PATENTS 370,963    4/1932    Great Britain.

HARRISON L. HINSON, Primary Examiner